(12) United States Patent
Abrahamse et al.

(10) Patent No.: US 12,268,228 B2
(45) Date of Patent: Apr. 8, 2025

(54) ONION FLAVOUR COMPOSITION AND METHOD FOR THE PREPARATION THEREOF

(71) Applicant: Conopco Inc., Englewood Cliffs, NJ (US)

(72) Inventors: Salomon Leendert Abrahamse, Wageningen (NL); Parag Acharya, Vlaardingen (NL); Amir Maximiliaan Batenburg, Vlaardingen (NL); Jochen Blume, Holzminden (DE); Lars Grohmann, Holzminden (DE); Matthias Hille, Holzminden (DE); Jens Koch, Holzminden (DE); Volkmar Koppe, Holzminden (DE); Christopher Sabater-Luentzel, Holzminden (DE); Michel Vander Stappen, Wageningen (NL)

(73) Assignee: Conopco Inc., Englewood Cliffs, NJ (US)

( * ) Notice: Subject to any disclaimer, the term of this patent is extended or adjusted under 35 U.S.C. 154(b) by 730 days.

(21) Appl. No.: 17/283,577

(22) PCT Filed: Nov. 5, 2019

(86) PCT No.: PCT/EP2019/080206
§ 371 (c)(1),
(2) Date: Apr. 8, 2021

(87) PCT Pub. No.: WO2020/099179
PCT Pub. Date: May 22, 2020

(65) Prior Publication Data
US 2021/0337846 A1    Nov. 4, 2021

(30) Foreign Application Priority Data

Nov. 16, 2018   (EP) ..................... 18206682

(51) Int. Cl.
*A23L 27/16* (2016.01)
*A23L 27/00* (2016.01)
*A23L 27/10* (2016.01)

(52) U.S. Cl.
CPC .............. *A23L 27/16* (2016.08); *A23L 27/105* (2016.08); *A23L 27/88* (2016.08)

(58) Field of Classification Search
CPC ........ A23L 27/16; A23L 27/105; A23L 27/88; A23L 2/04; A23L 5/51; A23L 19/09; A23V 2200/15; A23V 2200/16
USPC ........................ 426/534, 589, 590
See application file for complete search history.

(56) References Cited

U.S. PATENT DOCUMENTS

| | | | | |
|---|---|---|---|---|
| 3,037,866 A * | 6/1962 | Evans | ................... | A23L 27/105 426/651 |
| 3,424,592 A * | 1/1969 | Heinz | ................... | A23L 27/105 426/602 |
| 3,582,361 A * | 6/1971 | Huth | ...................... | A23L 27/105 426/98 |
| 3,645,753 A * | 2/1972 | Gasser | .................. | A23L 27/215 426/655 |
| 3,645,756 A * | 2/1972 | Huth | ..................... | A23L 27/105 426/429 |
| 4,165,391 A * | 8/1979 | Corbett | ................. | A23L 33/145 426/582 |
| 4,194,017 A * | 3/1980 | Poiger | .................. | A23L 27/215 426/533 |
| 4,476,147 A * | 10/1984 | Hall | ........................ | C07C 33/02 426/534 |
| 6,340,494 B1* | 1/2002 | Klukowski | ............. | A23P 10/22 426/465 |
| 2002/0155193 A1* | 10/2002 | Zurbriggen | ............. | A23L 27/26 426/52 |
| 2003/0035881 A1* | 2/2003 | Khairullah | .............. | A23L 19/03 426/615 |
| 2008/0182006 A1* | 7/2008 | Cremer | ................... | A23L 19/01 426/629 |

(Continued)

FOREIGN PATENT DOCUMENTS

| CN | 101223965 | 2/2008 |
|---|---|---|
| CN | 101791095 | 1/2010 |

(Continued)

OTHER PUBLICATIONS

Analysis of Volatile Compounds from Fresh and Dried Allium cepa L; Nov. 25, 2012; abstract only; 33.

(Continued)

*Primary Examiner* — Drew E Becker
*Assistant Examiner* — Luis Eugenio Diou Berdecia
(74) *Attorney, Agent, or Firm* — N.V. Nederlandsch Octrooibureau

(57) ABSTRACT

Provided herein is a method of producing an onion flavour composition that involves providing an onion component selected from fresh onion, dehydrated onion, and combination thereof; mixing the onion component with an onion juice concentrate having a dry matter content of 40-95 wt % in a weight ratio of 100 parts by weight of dry matter from the onion component with 120-800 parts by weight of dry matter from the onion juice concentrate to produce an onion mix; subjecting the onion mix to a heat treatment; and drying the onion mix to a water content of less than 10 wt %. This method yields a shelf-stable onion flavor composition with an intense flavor and that can be used to impart the flavor of sauteed onion to a variety of edible products.

8 Claims, No Drawings

(56) References Cited

U.S. PATENT DOCUMENTS

| | | | | |
|---|---|---|---|---|
| 2008/0268123 | A1* | 10/2008 | Hofmann | A23L 27/2022 |
| | | | | 426/534 |
| 2010/0075010 | A1* | 3/2010 | Tondeur | A23L 27/16 |
| | | | | 426/535 |
| 2012/0045565 | A1* | 2/2012 | Watson | A01H 5/04 |
| | | | | 435/410 |
| 2012/0114827 | A1* | 5/2012 | Yoneshige | A23L 2/02 |
| | | | | 426/429 |
| 2012/0177807 | A1* | 7/2012 | Kortes | A23L 27/23 |
| | | | | 426/442 |
| 2014/0248332 | A1* | 9/2014 | Boderke | A61K 9/127 |
| | | | | 424/754 |
| 2018/0228190 | A1* | 8/2018 | Jansen | A23L 23/10 |

FOREIGN PATENT DOCUMENTS

| | | | | |
|---|---|---|---|---|
| CN | 102273606 | | 12/2011 | |
| CN | 102273606 A | * | 12/2011 | |
| CN | 108450825 | | 12/2016 | |
| EP | 2485604 | | 6/2016 | |
| EP | 2801264 | | 5/2018 | |
| EP | 2801264 B1 | * | 5/2018 | A23L 2/56 |
| GB | 200817393 | | 10/2008 | |
| JP | 2010142148 | | 7/2010 | |
| KR | 20180005938 A | * | 1/2018 | A23L 19/00 |
| KR | 1020180005938 | | 1/2018 | |
| RU | 2650808 C1 | | 4/2018 | |
| WO | WO-2010002311 A1 | * | 1/2010 | A23L 1/2128 |
| WO | WO2012159873 | | 11/2012 | |
| WO | WO-2013056969 A1 | * | 4/2013 | A23L 19/09 |
| WO | WO-2017140439 A1 | * | 8/2017 | A23B 7/028 |
| WO | WO2017157417 | | 9/2017 | |
| WO | WO-2017157417 A1 | * | 9/2017 | A23L 19/00 |
| WO | WO-2017220423 A1 | * | 12/2017 | A23L 19/00 |

OTHER PUBLICATIONS

Mans Boelens et al; Volatile flavor compounds from onion; Odor Evaluation and Threshold Determinations; May 1, 1971; 990; Figs 2,6; Tables III, IV; XP055206161; DOI: 10.1021/jf60177a031; vol. 19, No. 5.

J.L. Wu, C.C. Chou, M.H. Chen, C.M. Wu; Volatile Flavor Compounds from Shallots; Volatile Flavor Compounds from Shallots; Mar. 1, 1982; 606-608; Fig. 3; Tables 1,2; XP55230218; DOI: 10.1111/j.1365-2621.1982.tb10133.x; vol. 47, No. 2.

* cited by examiner

ONION FLAVOUR COMPOSITION AND METHOD FOR THE PREPARATION THEREOF

TECHNICAL FIELD OF THE INVENTION

The present invention relates to a method of producing an onion flavour composition, said method comprising:
- providing onion component selected from fresh onion, dehydrated onion and combinations thereof;
- providing onion juice concentrate;
- mixing the onion component with the onion juice concentrate to produce an onion mix;
- subjecting the onion mix to a heat treatment at a temperature of more than 100° C.; and
- drying the onion mix to a water content of less than 10 wt. % simultaneous with and/or after the heat treatment.

The onion flavour composition so obtained can suitably be incorporated in edible products to impart the flavour of sautéed onion.

BACKGROUND OF THE INVENTION

The onion (*Allium cepa* L.), is a vegetable that is the most widely cultivated species of the genus *Allium*. Its close relatives include the garlic, leek, chive, and Chinese onion.

Onions are commonly chopped and used as an ingredient in various hearty warm dishes, and may also be used as a main ingredient in their own right, for example in French onion soup, creamed onions, and onion chutney. Onions are versatile and can be baked, boiled, braised, grilled, fried, roasted, sautéed, or eaten raw in salads.

Onions are available in fresh, frozen, canned, caramelised, pickled, and chopped forms. The dehydrated product is available as kibbled, sliced, ring, minced, chopped, granulated, and powder forms.

Onion powder is a seasoning widely used when the fresh ingredient is not available. It is made from finely ground, dehydrated onions. Being dehydrated, it has a long shelf life. However, the flavour intensity of onion powder is rather low and its flavour profile is quite different from the onion flavour profile that is desired in various food applications, e.g. the flavour of sautéed onions.

U.S. 2002/0155193 describes a method for preparing an onion/garlic biohydrolysate based
- flavouring base which comprises:
- mixing water with onion, garlic, or onion and garlic to form a mixture;
- hydrolysing the mixture with one or more technical enzymes; and
- thermally treating the hydrolysate at a temperature and for a time sufficient for providing a flavouring base.

U.S. 2012/0114827 describes a process for producing an onion extract, the process comprising: any one of the following steps (a) to (d); and a step of distribution washing a crude onion extract, onion suspension or concentrate thereof, which has been obtained by the following step, with an organic solvent,
- (a) a step of heating the crude onion extract or concentrate thereof, which is obtained by at least either extracting or squeezing a fresh onion;
- (b) a step of heating a fresh onion, and then obtaining the crude onion extract or concentrate thereof by at least either extracting or squeezing;
- (c) a step of heat-extracting a fresh onion, thereby giving the crude onion extract or concentrate thereof; and
- (d) a step of heating a fresh onion and then cutting into small pieces, thereby giving the onion suspension or concentrate thereof.

KR 2018 0005938 describes a method of manufacturing a highly concentrated onion juice, comprising:
- (a) washing an onion;
- (b) heating the onion;
- (c) filtering the heated onion to separate onion juice and onion solids;
- (d) reheating the onion juice;
- (e) drying the onion solids;
- (f) pulverizing the dried onion solids;
- (g) heating and re-heating the reheated onion juice in the vacuum concentrator after the step (d);
- (h) adding the onion solid powder pulverized in the step (f) to the concentrated onion concentrate of step (g);
- (i) dispersing the pulverized onion solid powder with a stirrer, and then post-heating at 80 to 95° C. for 10 to 25 minutes;
- (j) transferring the pellets to a packaging machine, and filling the pellets with the packaging paper.

CN 102 273 606 describes a method for preparing an onion powder, said method comprising the following steps:
- grind onions, followed by the addition of cellulase and enzymolysis in 0.5-3 hours to obtain an enzymolysed onion solution;
- add onion powder, concentrated onion juice, spice powder, edible oil and water, and heat to 120-130° C. under stirring for 1-5 hours;
- cool to 50-70° C., add butylhydroxy-anisole, xanthan gum, maltodextrin, pass through a colloid mill and homogenize at 20-30 MPa pressure;
- spray dry the homogenized mixture.

EP-B 2 485 604 describes a process to produce a concentrated vegetable flavour comprising,
- preparing a composition comprising a vegetable, an oil and a yeast extract and/or yeast autolysate,
- intimately mixing the composition in an extruder at a temperature between 100° C. and 160° C. and a reaction time between 1 second and 1 week, sufficient for the concentrated vegetable flavour to develop,
wherein the water content of the composition before or during step b) is between 1% and 8% w/w based on the total weight of the composition EP-B 2 801 264 describes a method for producing a salty taste enhancer, comprising heating liquid of a mashed liliaceae vegetable, juice of a liliaceae vegetable, enzyme-treated liquid of a liliaceae vegetable, or a concentrate thereof. The Examples of describe the preparation of a salty taste enhancer by combining concentrated onion juice with finely ground plant tissue from onion, followed by heating.

SUMMARY OF THE INVENTION

The inventors have developed a method of producing a shelf-stable onion flavour composition that has an intense flavour, and that can suitably be used to impart the flavour of sautéed onion to a wide variety of edible products. The method comprises the following steps:
- providing onion component selected from fresh onion, dehydrated onion and combinations thereof;
- providing onion juice concentrate having a dry matter content of 40-95 wt. %;
- mixing the onion component with the onion juice concentrate in a weight ratio, calculated on a dry matter basis, of 100 parts by weight of dry matter from onion component with 60 to 1000 parts by weight of dry matter from onion juice concentrate, to produce an onion mix;

subjecting the onion mix to a heat treatment at a temperature of more than 100° C. for at least 5 minutes; and drying the onion mix to a water content of less than 10 wt. % simultaneous with and/or after the heat treatment.

The invention also relates to an onion flavour composition that is obtained by the aforementioned method, said onion flavour composition comprising:

at least 2.5 mg/kg of group A substances selected from dimethyl trisulfide, dimethyl tetrasulfide, dipropyl disulfide, 2-methyl-2-pentenal and 3,4-dimethylthiophene and combinations thereof;

0-4 mg/kg of group B substances selected from furfural, isobutyraldehyde, 5-methylfurfural, cis-methyl-1-propenyl disulphide and combinations thereof; wherein the group A substances and the group B substances are present in the onion flavour composition in a molar ratio of at least 1:1.

The invention further relates to the use of this onion flavour composition in edible products.

DETAILED DESCRIPTION OF THE INVENTION

A first aspect of the invention relates to a method of producing an onion flavour composition, said method comprising:

providing onion component selected from fresh onion, dehydrated onion and combinations thereof;

providing onion juice concentrate having a dry matter content of 40-95 wt. %;

mixing the onion component with the onion juice concentrate in a weight ratio, calculated on a dry matter basis, of 100 parts by weight of dry matter from onion component with 60 to 1000 parts by weight of dry matter from onion juice concentrate, produce an onion mix;

subjecting the onion mix to a heat treatment at a temperature of more than 100° C. for at least 5 minutes; and drying the onion mix to a water content of less than 10 wt. % simultaneous with and/or after the heat treatment.

The term "onion" as used herein, unless indicated otherwise, refers to onion bulb.

The term "fresh onion" as used herein refers to non-dehydrated whole onion or to non-dehydrated pieces of onion.

The term "dehydrated onion" as used herein refers to the material obtained after dehydrating fresh onion, especially after dehydrating chopped or pureed fresh onion.

The term "onion powder" as used herein refers to dehydrated onion in the form of a powder consisting of particles of dried onion.

The term "onion juice" as used herein refers to the liquid that is obtained by pressing onions.

The term "onion juice concentrate" as used herein refers to onion juice from which at least a part of the water has been removed, e.g. by evaporation or reverse osmosis.

The term "onion pomace" as used herein refers to the solid residue that remains after pressing onions for juice. The term "onion pomace" also encompasses dried onion pomace.

The water content of the onion flavour composition or of ingredients used in the preparation of the onion flavour composition can suitably be determined by means of Karl Fischer Titration.

The dry matter content of the onion flavour composition and of ingredients used in the preparation of the onion flavour composition equals 100 wt. % minus the water content (in wt. %).

The onion component employed in the present method preferably is preferably selected from fresh onion, onion powder and combinations thereof. Most preferably, the onion component is fresh onion. The fresh onion that is employed in the present method typically contains 60-88 wt. % water. More preferably, the fresh onion has a water content of 70-85 wt. %.

The onion juice concentrate that is employed in the present method preferably has a dry matter content of 50-90 wt. %, more preferably of 60-88 wt. % and most preferably of 70-85 wt. %.

The onion mix that is obtained by mixing the onion component with the onion juice concentrate, typically is a suspension of pieces of onion. Such a suspension may be prepared by mixing chopped fresh onion with the onion juice concentrate. Alternatively, the suspension may be prepared by combining fresh onion with the onion juice concentrate, followed by a processing step in which the fresh onion is cut into pieces and dispersed throughout the onion juice concentrate.

The onion mix that is obtained by the mixing of the onion component with onion juice concentrate preferably has a dry matter content of 20-80 wt. %, more preferably a dry matter content of 30-70 wt. % and most preferably a dry matter content of 35-60 wt. %.

The combination of onion component and onion juice concentrate typically constitutes at least 50 wt. %, more preferably at least 80 wt. %, most preferably at least 95 wt. % of the onion mix.

In a preferred embodiment, the onion mix is prepared by mixing the onion component with the onion juice concentrate in a weight ratio, calculated on a dry matter basis, of 100 parts by weight of dry matter from onion component with 100 to 800 parts by weight of dry matter from onion juice concentrate, more preferably by mixing the onion component with the onion juice concentrate in a weight ratio, calculated on a dry matter basis, of 100 parts by weight of dry matter from onion component with 120 to 600 parts by weight of dry matter from onion juice concentrate.

In the present method, the onion mix is preferably subjected to a heat treatment at a temperature of 110-200° C., more preferably at a temperature of 120-170° C. The duration of the heat treatment preferably is in the range of 8 to 600 minutes, more preferably in the range of 10-300 minutes.

The onion mix may be dried using different drying techniques. Preferably, the onion mix is dried by means of belt drying, tray drying, drum drying or spray drying. More preferably, the onion mix is dried by belt drying or tray drying. Most preferably, the onion mix is dried by means of belt drying.

Preferably, the onion mix is dried at a reduced pressure of not more than 100 mbar, more preferably at a reduced pressure of less than 50 mbar, most preferably at a reduced pressure of 0.5-20 mbar.

According to a particularly preferred embodiment, the heat treatment of the onion mix and the drying of the onion mix to a water content of less than 10 wt. % are carried out simultaneously. Accordingly, the onion mix is preferably dried at a temperature of more than 100° C. for at least 10 minutes. More preferably, the onion mix is dried at a temperature of 110-200° C., most preferably at a temperature of 120-170° C. The duration of the drying is preferably in the range of 8 to 200 minutes, more preferably in the range of 10-120 minutes dried for 20 to 600 minutes at a temperature of 110-200° C., more preferably at a temperature of 120-170° C.

Typically, the onion mix is dried to a water content of less than 8 wt. %, more preferably of less than 5 wt. %.

In a particularly preferred embodiment, the onion mix is mixed with onion pomace before or after the drying of the onion mix. Most preferably, the onion mix is mixed with onion pomace after the heat treatment and the drying of the onion mix.

In accordance with one preferred embodiment, the dried onion mix is mixed with onion pomace in a weight ratio, calculated on a dry matter basis, of 100 parts by weight of dry matter from dried onion mix with 3 to 80 parts by weight of dry matter from onion pomace, said onion pomace having a dry matter content of 20-100 wt %. More preferably, the dried onion mix is mixed with onion pomace in a weight ratio, calculated on a dry matter basis, of 100 parts by weight of dry matter from dried onion mix with 4 to 60 parts by weight of dry matter from onion pomace. Most preferably, the dried onion mix is mixed with onion pomace in a weight ratio, calculated on a dry matter basis, of 100 parts by weight of dry matter from dried onion mix with 8 to 40 parts by weight of dry matter from onion pomace.

The onion pomace employed in the present method present method preferably is dried onion pomace. According to a particularly preferred embodiment, the onion pomace has been dried at a temperature of at least 100° C. for at least 20 minutes. More preferably, the onion pomace has been dried at a temperature of 105-180° C., most preferably at a temperature of 110-150° C. The drying period preferably lies in the range of 40-800 minutes, most preferably in the range of 60-600 minutes.

The dried onion pomace that is employed in the present process preferably has been dried by means of hot air drying.

Preferably, the onion pomace that is mixed with the dried onion mix has a dry matter content of 70-100 wt. %, more preferably of 90-100 wt. % and most preferably of 95-100 wt. %.

The present method preferably comprises the step of milling the dried onion mix or the mixture of dried onion mix and onion pomace. Preferably, the milled onion flavour composition obtained is a powder having a mass weighted mean diameter of less than 1 mm, more preferably having a mass weighted mean diameter in the range of 0.1-0.8 mm.

Another aspect of the present invention relates to an onion flavour composition that is obtained by the production method that is described herein, said onion flavour composition comprising:
- at least 2 at least 2.5 mg/kg of group A substances selected from dimethyl trisulfide, dimethyl tetrasulfide, dipropyl disulfide, 2-methyl-2-pentenal and 3,4-dimethylthiophene and combinations thereof;
- 0-4 mg/kg of group B substances selected from furfural, isobutyraldehyde, 5-methylfurfural, cis-methyl-1-propenyl disulphide and combinations thereof;

wherein the group A substances and the group B substances are present in the onion flavour composition in a molar ratio of at least 1:1.

In accordance with a particularly preferred embodiment, the bulk of the dry matter contained in the onion flavour composition is derived from onion. Accordingly, dry matter from onion preferably constitutes at least 90 wt. %, more preferably at least 95 wt. % and most preferably at least 98 wt. % of the dry matter contained in the onion flavour composition.

The onion flavour composition of the present invention preferably is a powder, more preferably a powder having a mass weighted mean diameter of less than 1 mm, most preferably having a mass weighted mean diameter in the range of 0.1-0.8 mm.

The onion flavour composition typically contains at least 2.8 mg/kg and most preferably 3-20 mg/kg of group A substances selected from dimethyl trisulfide, dimethyl tetrasulfide, dipropyl disulfide, 2-methyl-2-pentenal and 3,4-dimethylthiophene and combinations thereof. The group A substances contribute to the sautéed onion flavour character of the onion flavour composition.

Preferably, the onion flavour composition contains 0-3 mg/kg, more preferably 0-2.5 and most preferably 0-2 mg/kg of group B substances selected from furfural, isobutyraldehyde, 5-methylfurfural, cis-methyl-1-propenyl disulphide and combinations thereof.

The aforementioned group A substances and group B substances are typically present in the onion flavour composition in a molar ratio of at least 2:1, more preferably of at least 3:1, and most preferably of at least 3.5:1.

In a preferred embodiment, the onion flavour composition contains at least 2 mg/kg, more preferably at least 3 mg/kg of dimethyl trisulfide, 3,4-dimethylthiophene and/or 2-methyl-2-pentenal The combination of 5-methylfurfural and isobutyraldehyde is preferably not contained in the onion flavour composition or present in a combined concentration of not more than 2 mg/kg more preferably of not more than 1 mg/kg.

A further aspect of the invention relates to a process of producing an edible product, said process comprising combining the onion flavour composition of the present invention with one or more other edible ingredients.

The present process preferably comprises application of the onion flavour composition in an amount sufficient to add at least 10 µg/kg, more preferably 40-800 µg/kg of group A substances selected from dimethyl trisulfide, dimethyl tetrasulfide, dipropyl disulfide, 2-methyl-2-pentenal and 3,4-dimethylthiophene and combinations thereof.

The onion flavour composition is preferably applied in an amount that constitutes at least 0.5 wt. %, preferably 0.8-8 wt. % of the edible product.

The present process is particularly suitable for the production of an edible product selected from soups, sauces, bouillons, savoury concentrates, dressings, seasonings and snacks. The present process is particularly suitable for the production of edible products in the form dry powders (e.g. dry soups, dry sauces or bouillon powders) or in the form of cubes or granulates (e.g. bouillon cubes or bouillon granulates).

The onion flavour composition of the present invention can suitably be used to enhance/improve the onion flavour of edible products that contain onion. Thus, according to a particularly preferred embodiment, the present process comprises combining the onion flavour composition with pieces of onion.

Dry matter from onion preferably constitutes at least 1 wt. %, more preferably 2-20 wt. % of the dry matter contained in the edible product.

Per kg of dry matter from onion the edible product preferably contains:

- at least 2.5 mg of group A substances selected from dimethyl trisulfide, dimethyl tetrasulfide, dipropyl disulfide, 2-methyl-2-pentenal and 3,4-dimethylthiophene and combinations thereof;
- 0-10 mg of group B substances selected from furfural, isobutyraldehyde, 5-methylfurfural, cis-methyl-1-propenyl disulphide and combinations thereof;

wherein the group A substances and the group B substances are present in the onion flavour composition in a molar ratio of at least 1:1, preferably of at least 2:1, more preferably of at least 3:1.

The edible product preferably comprises, per kg of dry matter from onion, at least 3 mg, more preferably at least 3.3 mg, and most preferably at least 3.5 mg of the group A substances.

According to a particularly preferred embodiment, the edible product contains, per kg of dry matter from onion, at least 2.5 mg of dimethyl trisulfide, 3,4-dimethylthiophene and/or 2-methyl-2-pentenal.

Typically, the edible product contains, per kg of dry matter from onion, not more than 6 mg, more preferably not more than 4 mg of the group B substances.

Per kg of dry matter from onion, the edible product preferably contains 0-4 mg, more preferably 0-2 mg of the combination of 5-methylfurfural and isobutyraldehyde.

The edible product of the present invention is preferably selected from soups, sauces, bouillons, savoury concentrates, dressings, seasonings and snacks. Preferably, the edible product is in the form dry powder (e.g. dry soups, dry sauces or bouillon powders) or in the form of cubes or granulates (e.g. bouillon cubes or bouillon granulates).

Finally, a further aspect of the invention relates to the use of an onion flavour composition for imparting onion flavour to or enhancing onion flavour in an edible product, wherein the onion flavour composition is an onion flavour composition as described herein.

The invention is further illustrated by the following non-limiting examples.

EXAMPLES

Example 1

An onion flavour composition having an intense sautéed onion flavour was produced as follows.

100 g of fresh onions were cut by a slicer to produce onion pieces.

The cut onion pieces were mixed with 87.5 g of onion juice concentrate (80° Bx) to produce an onion mix. The onion mix was dried by vacuum belt drying for 30 min at 140° C. at a pressure of 8 mbar, to produce approximately 90 g.

38 g of onion pomace having a dry matter content of appr. 28 wt. % was dried by hot air drying for 200 min at 130° C. or produce approximately 10 g of dried onion pomace.

The dried onion mix and the dried onion pomace were mixed and milled by an impact mill to produce the onion flavour composition.

The onion flavour composition was analysed by means of GC-MS. Table 1 shows the result of this analysis (concentration by weight (w/w) of the onion flavour composition).

TABLE 1

| Substance | mg/kg |
| --- | --- |
| Dimethyl tetrasulfide | 0.44 |
| Dimethyl trisulfide | 0.94 |
| 2-Methyl-2-pentenal | 0.59 |
| 3,4-Dimethyl-thiophene | 2.50 |
| Dipropyl disulfide | 0.41 |
| Furfural | 0.06 |
| Cis-Methyl-1-propenyldisulfide | 0.47 |
| Isobutyraldehyde | n.d. * |
| 5-methylfurfural | n.d. * |

* n.d. = not detectable

Example 2

An instant onion cream soup having the composition shown in Table 2 was prepared by dry mixing of the ingredients

TABLE 2

| Ingredient | Wt. % |
| --- | --- |
| Instant starch Prejel 70 VA | 20 |
| Fat powder Satro FP78 | 35 |
| Maltodextrin DE 18-20 | 27.8 |
| Stabilizer Hamulsion ® | 2 |
| skimmed milk powder | 2 |
| Onion flavour composition, Example 1 | 6 |
| Salt | 5 |
| MSG | 2 |
| Caramel sugar syrup powder | 0.2 |
| TOTAL | 100 |

A soup was prepared by stirring 140 g of the instant soup in 1 l water and boiling for 1 min.

The invention claimed is:

1. A method of producing an onion flavour composition, said method comprising:
   - providing an onion component selected from fresh onion, dehydrated onion, and combinations thereof;
   - mixing the onion component with an onion juice concentrate having a dry matter content of 40-95 wt. % in a weight ratio, calculated on a dry matter basis, of 100 parts by weight of dry matter from the onion component with 120 to 800 parts by weight of dry matter from the onion juice concentrate, to produce an onion mix;
   - subjecting the onion mix to a heat treatment at a temperature of 100-200° C. for 10-300 minutes;
   - drying the onion mix to a water content of less than 10 wt. % simultaneous with and/or after the heat treatment; and
   - mixing the dried onion mix with an onion pomace having a dry matter content of 70-100 wt. % in a weight ratio, calculated on a dry matter basis, of 100 parts by weight of dry matter from the dried onion mix with 4 to 60 parts by weight of dry matter from the onion pomace to produce the onion flavour composition;
   - wherein dry matter of onion constitutes at least 90 wt. % of the dry matter contained in the onion flavour composition.

2. The method according to claim 1, wherein the combination of onion component and onion juice concentrate constitutes at least 50 wt. % of the onion mix.

3. The method according to claim 1, wherein the onion mix is dried simultaneously with the heat treatment.

4. The method according to claim 1, wherein the onion mix is dried by means of belt drying or tray drying.

5. The method according to claim 1, wherein the onion pomace has a dry matter content of 90-100 wt %.

6. The method according to claim 1, wherein the onion mix comprises a suspension of pieces of onion.

7. The method according to claim 1, wherein the onion pomace is dried onion pomace that has been dried at a temperature of at least 100° C. for 20 minutes or more.

8. The method according to claim 1, further comprising milling the onion flavour composition to form a powder having a mass weighted mean diameter of less than 1 mm.

* * * * *